(12) United States Patent
Tsukamoto et al.

(10) Patent No.: US 8,426,766 B2
(45) Date of Patent: Apr. 23, 2013

(54) WELDING METHOD AND WELDING APPARATUS FOR AN IMPELLER

(75) Inventors: Takeshi Tsukamoto, Hitachinaka (JP); Yoshihisa Maeda, Tsuchiura (JP); Hiromi Kobayashi, Kasumigaura (JP); Hideto Nogiwa, Tsukuba (JP); Tetsuya Kuwano, Tsuchiura (JP); Ryujiro Udo, Ushiku (JP); Masaaki Iwasa, Hitachinaka (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 1200 days.

(21) Appl. No.: 12/248,271

(22) Filed: Oct. 9, 2008

(65) Prior Publication Data

US 2009/0095719 A1    Apr. 16, 2009

(30) Foreign Application Priority Data

Oct. 10, 2007    (JP) .................. 2007-264783

(51) Int. Cl.
*B23K 26/00*    (2006.01)

(52) U.S. Cl.
USPC ............. 219/121.63; 219/121.64; 219/121.8; 29/889

(58) Field of Classification Search ............. 219/121.63, 219/121.64, 121.65, 121.66, 76.1, 121.8, 219/121.62, 121.83; 29/889
See application file for complete search history.

(56) References Cited

U.S. PATENT DOCUMENTS

| | | | | |
|---|---|---|---|---|
| 3,310,423 A | * | 3/1967 | Ingham, Jr. .................. | 427/456 |
| 4,300,474 A | * | 11/1981 | Livsey ........................ | 118/641 |
| 4,302,657 A | | 11/1981 | Turelli et al. | |
| 4,323,756 A | * | 4/1982 | Brown et al. ............. | 219/121.66 |
| 5,321,228 A | | 6/1994 | Krause et al. | |
| 5,477,025 A | * | 12/1995 | Everett et al. ............ | 219/121.84 |

(Continued)

FOREIGN PATENT DOCUMENTS

| EP | 1 584 406 | 10/2005 |
|---|---|---|
| EP | 1 785 590 | 5/2007 |

(Continued)

OTHER PUBLICATIONS

Machine translation of EP 1785590 A1, accessed from http://www.epo.org on Jul. 12, 2012.*

(Continued)

*Primary Examiner* — Henry Yuen
*Assistant Examiner* — John Wasaff
(74) *Attorney, Agent, or Firm* — Mattingly & Malur, P.C.

(57) ABSTRACT

A welding method for an impeller having a plurality of blades, a disc and an exterior body including a shroud welded to the plurality of blades, comprising the steps of:
  a first step for forming a groove having a prescribed depth and a prescribed width toward one of the blades on a surface of the disc or the exterior body, which is opposite to a surface against the blade abuts, emitting laser light toward the bottom of the groove, and performing melt-through bead welding to bond the bottom of the groove to an end of the blade in such a way that a bead formed on the back of the disc or the shroud is curved with an inward depression; and
  a second step for performing overlaying welding after completion of the first step by supplying a filler metal to a molten zone while the bottom of the groove is scanned with the laser light.

10 Claims, 7 Drawing Sheets

U.S. PATENT DOCUMENTS

| | | | |
|---|---|---|---|
| 5,483,034 A * | 1/1996 | Havard et al. | 219/121.64 |
| 5,902,498 A * | 5/1999 | Mistry et al. | 219/121.64 |
| 5,914,059 A * | 6/1999 | Marcin et al. | 219/121.66 |
| 6,146,094 A | 11/2000 | Obana et al. | |
| 6,667,456 B2 * | 12/2003 | Mukasa et al. | 219/121.63 |
| 6,881,919 B2 * | 4/2005 | Pyritz et al. | 219/76.1 |
| 7,520,055 B2 | 4/2009 | Lundgren | |
| 2002/0008090 A1 * | 1/2002 | Mukasa et al. | 219/121.63 |
| 2004/0158984 A1 | 8/2004 | Lundgren | |
| 2004/0169021 A1 * | 9/2004 | Baker et al. | 219/121.63 |
| 2008/0135530 A1 * | 6/2008 | Lee et al. | 219/121.64 |
| 2008/0237195 A1 | 10/2008 | Iwasa | |

FOREIGN PATENT DOCUMENTS

| | | |
|---|---|---|
| JP | 58-098699 | 6/1983 |
| JP | 61-262465 | 11/1986 |
| JP | 62-28071 | 2/1987 |
| JP | 62-107866 | 5/1987 |
| JP | 62-118974 | 5/1987 |
| JP | 63-026285 | 2/1988 |
| JP | 63-026286 | 2/1988 |
| JP | 64-048682 | 2/1989 |
| JP | 3-155487 A | 7/1991 |
| JP | 05-000372 | 1/1993 |
| JP | 6-126475 A | 5/1994 |
| JP | 7-51871 A | 2/1995 |
| JP | 8-174245 A | 7/1996 |
| JP | 9-1371 A | 1/1997 |
| JP | 9-314364 A | 12/1997 |
| JP | 09-324794 | 12/1997 |
| JP | 11-30195 A | 2/1999 |
| JP | 11-148496 | 6/1999 |
| JP | 11-302819 A | 11/1999 |
| JP | 2002-098090 | 4/2002 |
| JP | 2002-364588 | 12/2002 |
| JP | 2004-036485 | 2/2004 |
| JP | 2004-63406 A | 2/2004 |
| JP | 2005-501992 A | 1/2005 |
| WO | WO 03/066272 | 8/2003 |

OTHER PUBLICATIONS

Extended European Search Report for European Patent Application No. 08017584.7-2302, dated Feb. 17, 2009.

* cited by examiner

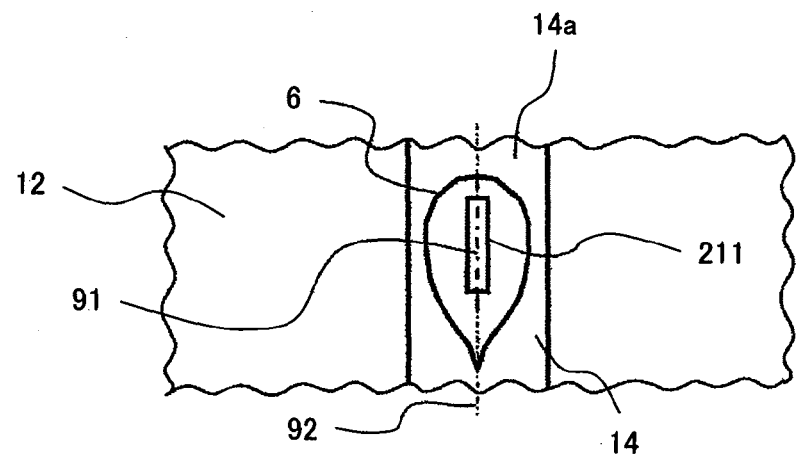
FIG. 2A
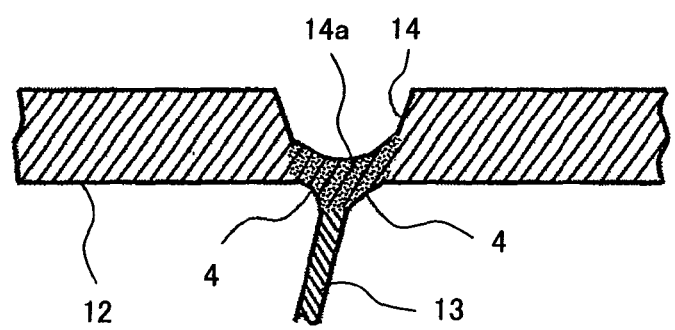
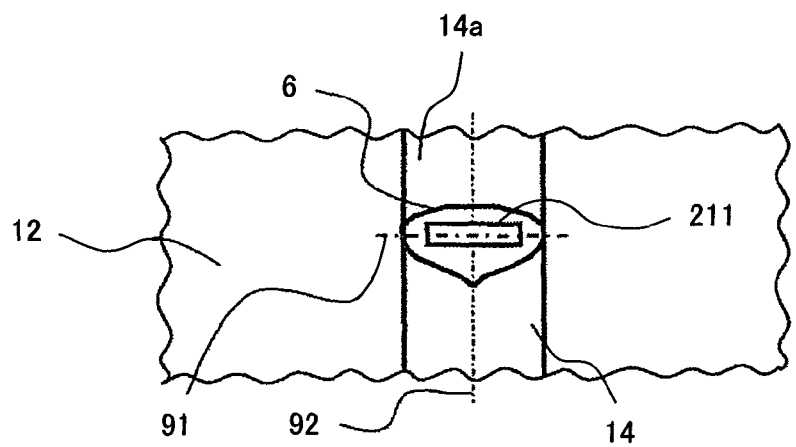
FIG. 2B
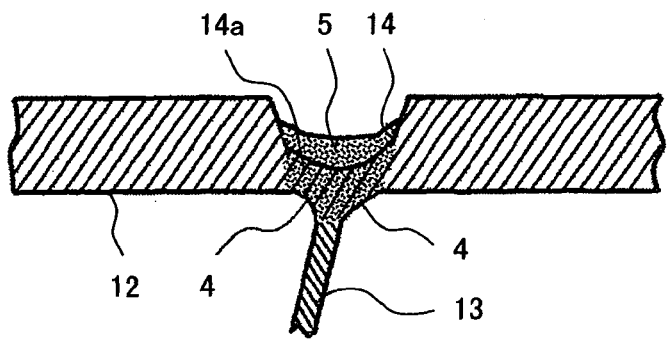

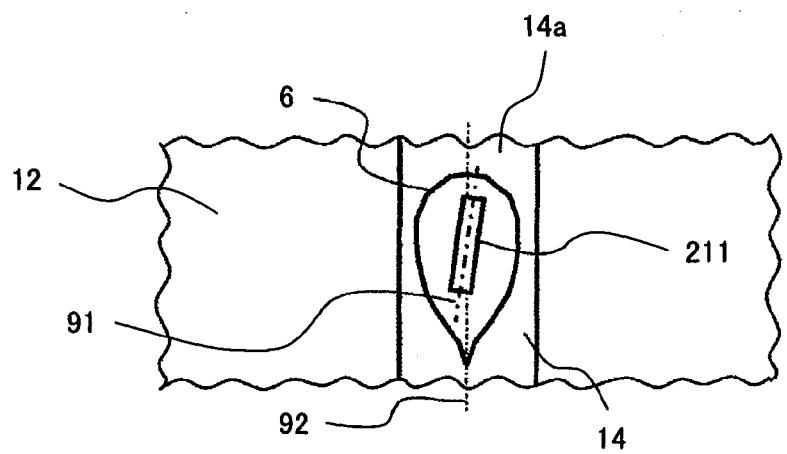
FIG. 5A
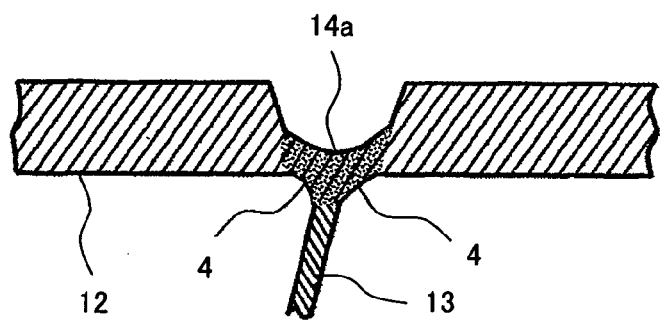
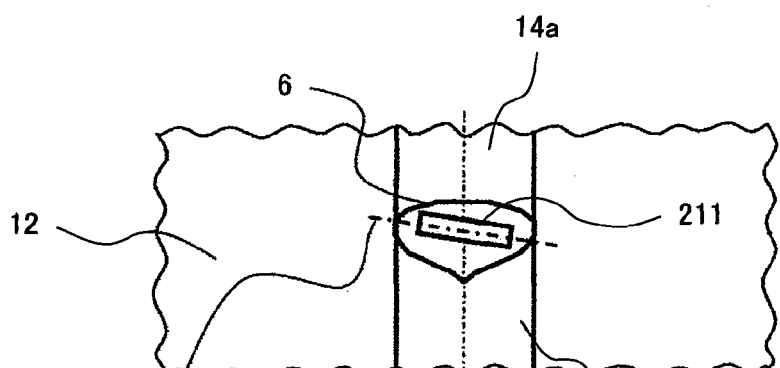
FIG. 5B
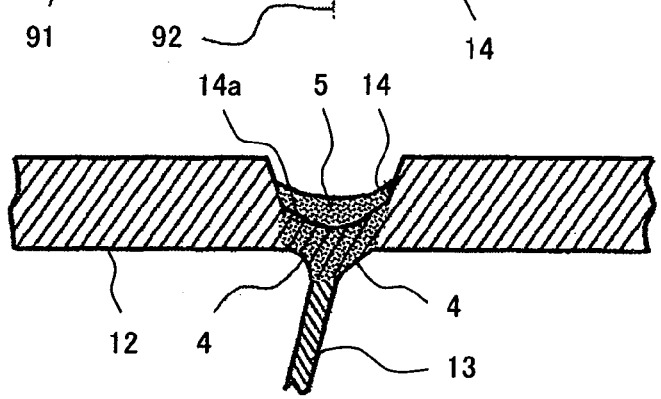

WELDING METHOD AND WELDING APPARATUS FOR AN IMPELLER

CROSS-REFERENCE TO RELATED APPLICATIONS

The present application claims priority from Japanese patent application serial No. 2007-264783, filed on Oct. 10, 2007, the content of which is hereby incorporated by reference into this application.

BACKGROUND OF THE INVENTION

1. Field of the Invention

The present invention relates to a method of welding an impeller used in a centrifugal compressor or the like and to an apparatus for welding the impeller, and more particularly to a welding method and a welding apparatus suitable for bonding blades, a disc, and an exterior body including a shroud and the like, which are constituent elements of an impeller.

2. Description of Related Art

If an impeller used in a centrifugal compressor or the like comprises a disc 11, a shroud 12, and blades 13, as shown in FIG. 7, these constituent elements are usually welded to integrate them into a single piece during the process of manufacturing the impeller. A first, widely used method of welding the blades 13 is to bond the disc 11 and blades 13, which are machined as separate members, and to bond the shroud 12 and blades 13, which are also machined as separate members, by fillet welding in an arc welding method such as shielded metal arc welding, metal inert gas (MIG) welding, or tungsten inert gas (TIG) welding, as shown in FIG. 8. Another, second method is to form the blades 13 and disc 11 by cutting or another type of machining so that they become an integral part, to insert each of the blades 13 into a slot formed in the shroud 12, and to apply overlaying welding to the slot by an arc welding method to bond an end of the blade 13 to the shroud 12, as shown in FIG. 9.

In the first method, positioning precision is low. Since the height of the blade 13 is low, another problem occurs if a gap 15 between the disc 11 and shroud 12 is small. A welding rod and a welding torch cannot be inserted into the gap, thus preventing welding.

The second method is advantageous in that welding is performed from the outer surface of the shroud 12, and thus welding is possible even when there is a gap between the disc 11 and shroud 12. However, welding heat input is large and welding deformation becomes problematic. Another problem is that a backing bead 4, which is formed at the bonding part between the shroud 12 and blade 13, is likely to have a non-uniform shape due to variations in arc.

In a conventional method, as disclosed in, for example, the Japanese Patent Application Laid-open No. Sho 62 (1987)-107866, in order to address these problems, a water-soluble deformation preventing material and a heat-resistant ceramic backing material are placed between the disc 11 and shroud 12 to suppress welding deformation and to adjust the shape of the backing bead. In another method, as disclosed in the Japanese Patent Application Laid-open No. Sho 63 (1988)-26285, electron beams that have a high energy density, and that can reduce the welding heat input, are used as the heat source to form the backing bead and to perform overlaying welding.

SUMMARY OF THE INVENTION

In the conventional welding method, in which the water-soluble deformation preventing material and heat-resistant ceramic backing material are used, a process for placing the deformation preventing material and backing material before welding and another process for removing the deformation preventing material and backing material after the welding are needed. The conventional method thus cannot be said to be superior in productivity. In the method in which electron beams are used, the welding is effected by deep penetration, so a concave backing bead is likely to be formed. To prevent stress from concentrating during the use of the impeller, the weld bead needs to undergo finish machining, that is, the bead needs to be machined so that it is curved with an inwardly rounded depression.

An object of the present invention is to provide a welding method and a welding apparatus for an impeller that can eliminate or simplify finishing machining applied to the weld bead. This will sufficiently alleviate the stress concentration generated during the use of the impeller, improve the productivity by eliminating the need to use the deformation preventing material and backing material. It will also increase overlaying welding efficiency, alleviate welding deformation, and ensure a prescribed strength at welded joints.

An additional object of the present invention is to provide a welding method and a welding apparatus for an impeller that can avoid interference between the impeller and parts of the welding apparatus, such as a nozzle that supplies a shield gas and another nozzle that supplies a filler metal. This method can thereby perform welding efficiently and appropriately, even when the blades have a three-dimensional twist.

To achieve the above objects, a welding method for an impeller according to the present invention is applied to an impeller having a plurality of blades, a disc and an exterior body including a shroud welded to the plurality of blades. The method comprises the steps of initially forming a groove having a prescribed depth and a prescribed width toward one of the blades on a surface of the disc or on the exterior body, which is opposite to a surface against the blade abuts, emitting laser light toward the bottom of the groove, and performing melt-through bead welding to bond the bottom of the groove to an end of the blade. A bead is thereby formed on the back of the disc or the shroud and is curved with an inward depression. A second step for performing overlaying welding after completion of the first step is accomplished by supplying a filler metal to a molten zone while the bottom of the groove is scanned with the laser light.

In a preferred aspect of the present invention, the groove is formed along the longitudinal direction of the blade, in such a way that the end of the blade on an abutting side, is positioned at the center, in the width direction of the groove and in a plane view. A focused beam of the laser light is scanned in such a way that the central part of the bottom of the groove in the width direction is passed.

In another preferred aspect of the present invention, the focused beam of the laser light has a thin rectangular or long elliptical shape. Scanning in the first step is performed along the longitudinal direction of the groove with the longer side or longer axis of the focused beam being parallel to or inclined at a prescribed angle with respect to the longitudinal direction of the groove. Scanning in the second step is performed along the longitudinal direction of the groove with the longer side or longer axis of the focused beam being inclined at an angle different from the prescribed angle in the first step with respect to the longitudinal direction of the groove.

Another welding method for an impeller according to the present invention is applied to an impeller having a disc or shroud with a plurality of blades and also includes another disc or shroud without blades. The method comprises the steps of: in a first step, forming a groove having a prescribed depth and a prescribed width on a surface of the disc or the shroud, which is opposite to a surface against the blade abuts. An end on an abutting side of the blade is positioned at the center in the width direction of the groove in a plane view. The central part in the width direction of the bottom of the groove is scanned with laser light, having a focused beam which has a thin rectangular or long elliptical shape, along the longitudinal direction of the groove to bond the bottom of the groove to an end of the blade by melt-through bead welding. A second step includes performing overlaying welding after completion of the first step by supplying a filler metal to a molten zone to fill the groove while scanning is performed in the longitudinal direction of the groove, with the longer side or longer axis of the focused beam being inclined at an angle different from an angle in the first step with respect to the longitudinal direction of the groove.

Yet another welding method for an impeller according to the present invention is applied to an impeller having a disc, a shroud, and a plurality of blades. A, first step includes forming a groove, which has a prescribed depth and a prescribed width, on a surface of the disc or the shroud, which is opposite to a surface against the blade abuts, with the groove being formed in such a way that the end on an abutting side of the blade is positioned at the center, in the width direction of the groove, in a plane view and for scanning the central part in the width direction of the bottom of the groove with laser light, and using a focused beam, with a thin rectangular or long elliptical shape, along the longitudinal direction of the groove to bond the bottom of the groove to an end of the blade by melt-through bead welding. A second step includes performing overlaying welding after completion of the first step by supplying a filler metal to a molten zone to fill the groove while scanning is performed in the longitudinal direction of the groove, with the longer side or longer axis of the focused beam being inclined at an angle different from an angle in the first step with respect to the longitudinal direction of the groove.

In a more preferable aspect of the present invention, scanning in the first step is performed with the longer side or longer axis of the focused beam being parallel to the longitudinal direction of the groove. Scanning in the second step is performed with the longer side or longer axis of the focused beam being orthogonal to the longitudinal direction of the groove.

In still another preferred aspect of the present invention, an inert gas is expelled to a welding zone in a lateral direction of the focused beam so as to shield the welding zone from the atmosphere. The filler metal is supplied through a jet flow of the inert gas to the molten zone.

In yet another preferred aspect of the present invention, a first inert gas is expelled to a welding zone in a lateral direction of the focused beam spot so as to shield the welded part from the atmosphere. A jet flow of a second inert gas is then formed in the jet flow of the first inert gas at a speed different from the speed of the jet flow of the first inert gas, and metallic powder is included as the filler metal in the jet flow of the second inert gas to supply the metallic powder to a molten zone.

A welding apparatus for an impeller according to the present invention comprises a laser light emitting unit for forming a focused beam having a thin rectangular or long elliptical shape, a filler metal supply nozzle for supplying a filler metal to the focused beam in a lateral direction of the focused beam at an angle different from an angle at which laser light is emitted, and a shield gas nozzle for expelling an inert gas. The inert gas encloses the outer periphery of the filler metal supplied from the filler metal supply nozzle.

Another welding apparatus for an impeller according to the present invention comprises a laser light emitting unit for forming a focused beam having a thin rectangular or long elliptical shape; a filler metal supply nozzle for supplying metallic powder as a filler metal in a flow of a second inert gas to the focused beam in a lateral direction of the focused beam at an angle different from an angle at which laser light is emitted, and a shield gas nozzle for expelling a first inert gas at a speed different from a speed of the second insert gas. The first inert gas encloses the outer periphery of the jet flow of the second inert gas including the metallic powder supplied from the metallic powder supply nozzle.

In a preferred aspect of the present invention, the cross section of a flow channel, formed in the metallic powder supply nozzle, through which the second inert gas including the metallic powder flows, is narrowed toward an outlet.

In another preferred aspect of the present invention, a flow channel, formed in the metallic powder supply nozzle, through which the second inert gas including the metallic powder-flows, is bent at an intermediate point.

In yet another preferred aspect of the present invention, the welding apparatus supports the outlet of the shield gas nozzle through an elastic, bendable member.

The impeller used in the present invention is manufactured by using one of the above welding methods and one of the above welding apparatuses. The impeller comprises a plurality of blades, a disc and an exterior body including a shroud welded to the plurality of blades. The bottom of a groove formed on a surface of the disc or on the exterior body, which is opposite to a surface against the blade abuts, is bonded to an end of the blade by melt-through bead welding. A bead part that is formed by the melt-through bead welding is curved with an inward depression.

According to the welding method and the welding apparatus for an impeller of the present invention, grooves are formed on the disc to be welded to the blades and the exterior body including the shroud. The bottom of each groove is illuminated with laser light to melt the bottom, and the bottom of the groove and one end of the blade associated with the groove are mutually bonded by melt-through bead welding in such a way that a bead formed on the back of the shroud is curved with an inward depression. As a result concentration of stress generated during the use of the impeller is sufficiently alleviated. In addition, finish machining applied to the backing bead can be eliminated or simplified, improving the productivity.

In the welding method and the welding apparatus for an impeller of the present invention, after the melt-through bead welding has been carried out for the groove, and while the focused beam of the laser light is scanned at an inclined angle with respect to the longitudinal direction of the groove, which is different from an inclined angle during the melt-through bead welding, a filler metal is supplied to the molten zone to carry out overlaying welding. Accordingly, a prescribed strength can be ensured for the welded joint, the efficiency of the melt-through bead welding can be improved, the total amount of welding heat input can be reduced, and deformation by welding can be alleviated. Since the need to use a deformation preventing material and backing material can be eliminated, productivity can further be improved as additional advantage.

With the welding apparatus for an impeller according to the present invention, a shield gas and a filler metal are supplied in a lateral direction of the focused beam of laser light at an angle different from an angle at which the laser light is emitted, so even when the impeller is a so-called three-dimensional impeller that has blades with a three-dimensional twist.

Interference between the impeller and parts of the welding apparatus, such as the nozzles for supplying a shield gas and a filler metal, can be surely avoided and thereby welding can be performed efficiently and appropriately, as an additional advantage.

Also, With the welding apparatus for an impeller according to the present invention, the shield gas nozzle 22 is unified with the metallic powder supply nozzle 23 therein to form a double-tube structure. The result is that the space between the shield gas nozzle 22 and the impeller 10 becomes wider. Interference between the impeller and parts of the welding apparatus can be surely avoided and thereby welding can be performed efficiently and appropriately.

BRIEF DESCRIPTION OF THE DRAWINGS

FIG. 1A is a partial cross sectional view during melt-through welding, which is performed in a first step;

FIG. 1B is a partial cross sectional view during overlaying welding, which is performed in a second step.

FIG. 2A is a partially enlarged view of FIG. 1A in the melt-through welding in the first step; FIG. 2B is a partially enlarged view of FIG. 1B in overlaying welding in the second step.

FIG. 4A is a partial cross sectional view during melt-through welding, which is performed in a first step;

FIG. 4B is a partial cross sectional view during overlaying welding, which is performed in a second step.

FIG. 5A is a partially enlarged view of FIG. 4A in the melt-through welding in the first step; FIG. 5B is a partially enlarged view of FIG. 4B in overlaying welding in the second step.

DETAILED DESCRIPTION OF THE PREFERRED EMBODIMENTS

Embodiments of the inventive welding method and welding apparatus for an impeller will be described with reference to the drawings.

A first embodiment of the inventive welding method and welding apparatus will be described with reference to FIGS. 1A, 1B, 2A, 2B, 3A, and 3B.

Figure 3A:
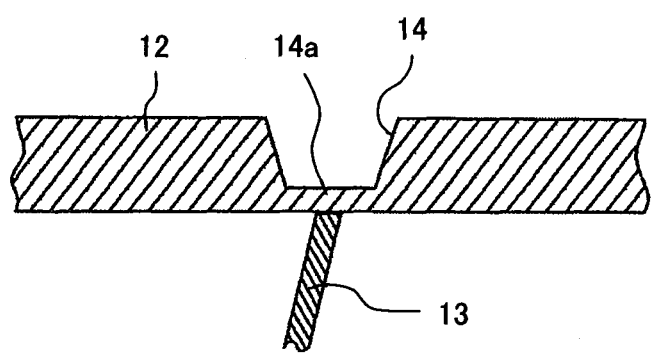
FIG. 3A is an enlarged cross sectional view of a groove formed in advance in a shroud.
Figure 7:
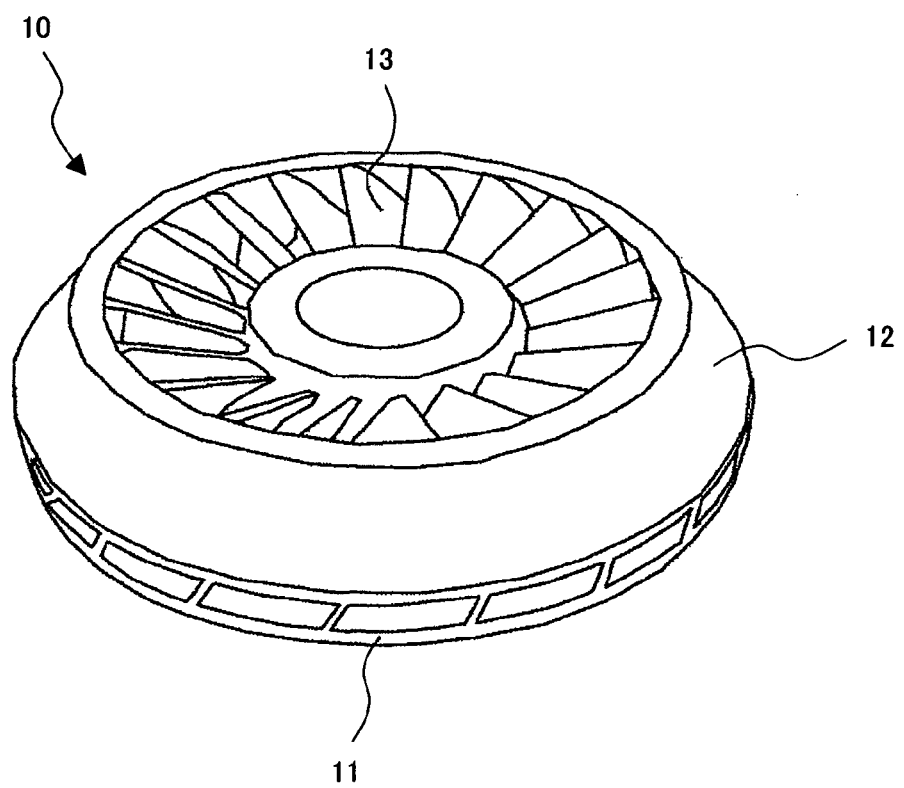
FIG. 7 is a perspective view showing an impeller.
Figure 8:
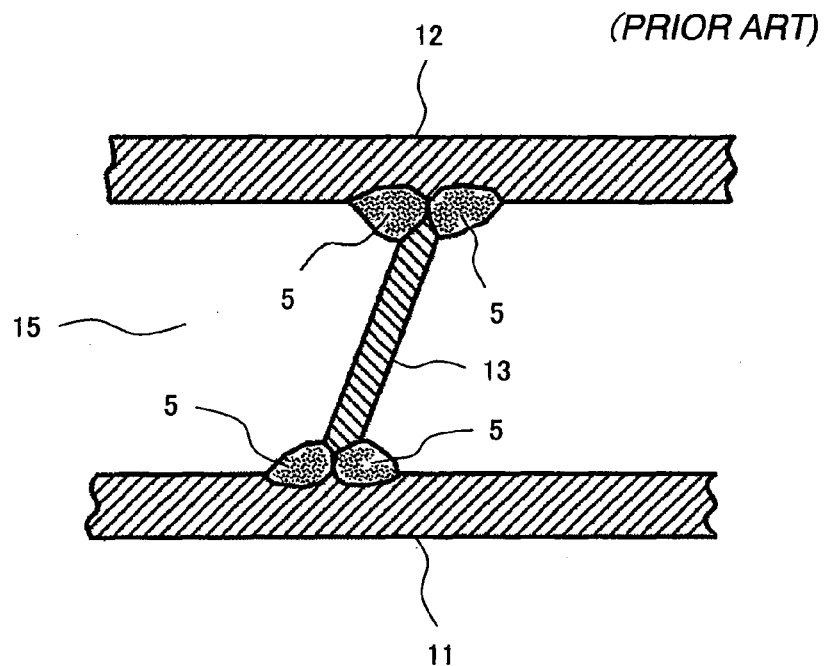
FIG. 8 illustrates an exemplary welding method for an impeller in the prior art.
Figure 9:
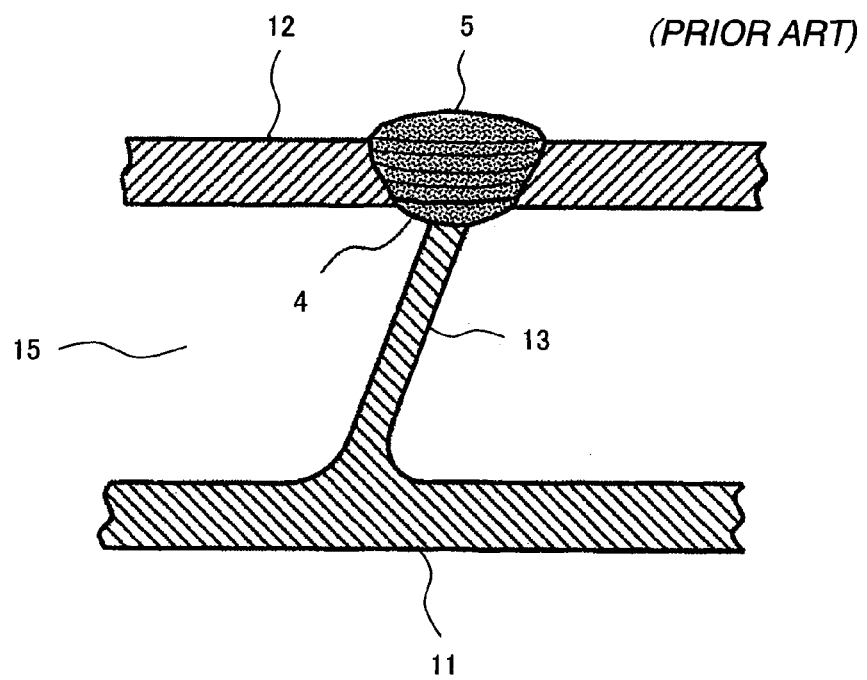
FIG. 9 illustrates another exemplary welding method for an impeller in the prior art.

In a case in which an impeller 10 in a centrifugal compressor or the like, it comprises a disc 11 having a plurality of blades 13 formed by machining and a shroud 12 without blades as shown in FIG. 7, this embodiment of the impeller 10 is applied when the blades 13 and the shroud 12 are mutually bonded. The disc 11, shroud 12, and blades 13 are made of the same material (SUS410, for example). A groove 14, the cross section of which is an inverted trapezoidal, that has a prescribed depth and width, is formed in advance for each of the plurality of blades 13 on a surface of the shroud 12, which is opposite to a surface against which the plurality of blades 13 abut, and extending along the longitudinal direction of the blade 13, the end of the blade 13 on its abutting side, in such a way that the end of the blade 13, on its abutting side, is positioned at the center, in the width direction, of the groove 14 in a plane view as shown in FIGS. 2A, 2B, and 3A. Specifically, the groove 14 is formed on the outer side of the shroud 12, which is a surface opposite to the surface against which the blade 13 abuts, the blade 13 being three-dimensionally twisted, in such a way that a bottom 14a of the groove 14 is made orthogonal to the blade 13. The shroud 12 is placed on the disc 11 and blade 13 so that the center of the thickness of the blade 13 is aligned to the central line 92 of the groove 14, and the shroud 12 is fixed by tack welding.

Figure 1A:
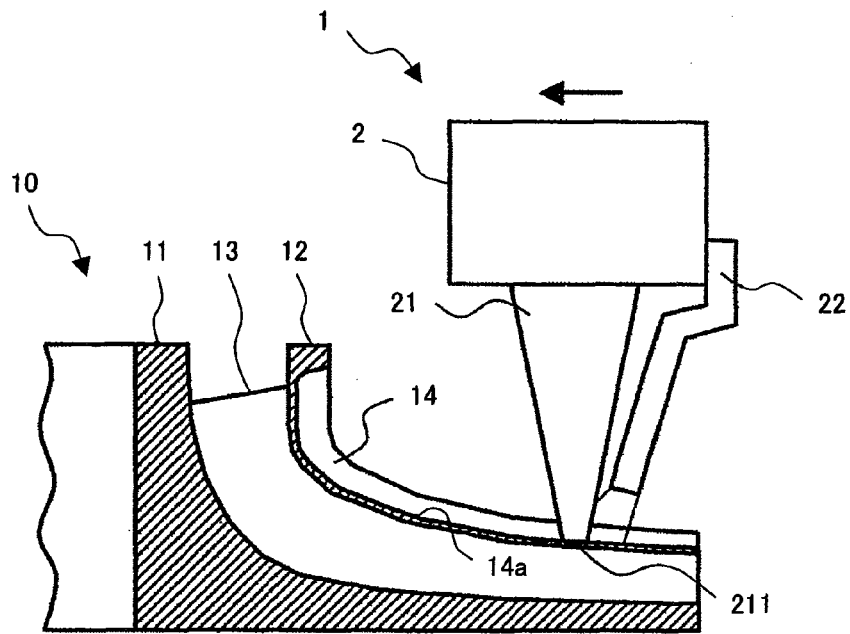
FIGS. 1A and 1B illustrate a first embodiment of the inventive welding method and welding apparatus for an impeller.
Figure 1B:
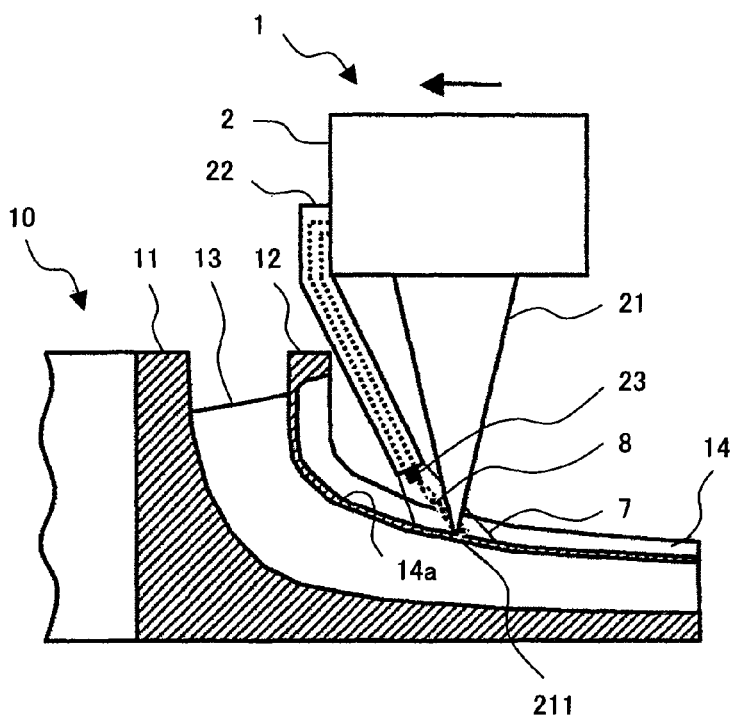

A laser welding apparatus 1, which is used in this embodiment, comprises a main unit 2 that is movable along the longitudinal direction of the groove 14, a nozzle having a double-tube structure that is supported by, and fixed to the main unit 2, and other components. The nozzle having a double-tube structure is comprised of a shield gas nozzle 22 which is unified with a metallic powder supply nozzle 23 that is disposed in the shield gas nozzle 22. The main unit 2 emits laser light 21 toward the center in the width direction of the bottom 14a of the groove 14, as shown in FIGS. 1A and 1B. The laser light 21 is adjusted by a lens or the like in the main unit 2 so that a focused beam 211 formed on the bottom 14a of the groove 14 has a thin rectangular shape, such as 1 mm wide and 10 mm long, for example, and the longer side of the focused beam 211 is parallel to or inclined at a prescribed angle with respect to the longitudinal direction of the groove 14. The metallic powder supply nozzle 23, which is one of a double-tube structure, includes metallic powder 8 in a flow of a second inert gas as a filler metal to supply it to the focused beam 211 in a lateral direction of the focused beam 211 at an angle different from the angle of the direction in which the laser light 21 is emitted. The shield gas nozzle 22, which is the other one of a double-tube structure, expels a first inert gas at a speed different from the speed of the second inert gas in such a way that the first inert gas encloses the outer periphery of the jet flow of the second inert gas including the metallic powder which is supplied from the metallic powder supply nozzle 23.

The welding apparatus 1 is used to bond the blades 13 to the shroud 12 as described below.

In a first step, as shown in FIGS. 1A and 2A, the focused beam 211 of the laser light 21 is positioned at the center of the width direction of the bottom 14a of the groove 14, on the central line 92 of the groove, with the longer side of the focused beam 211 being parallel to the longitudinal direction of the groove 14. Melt-through bead welding is then carried out to bond the bottom 14a of the groove 14 to an end of the blade 13 by performing scanning along the longitudinal direction of the groove 14.

In this embodiment, the shield gas nozzle 22 is disposed in a lateral direction of the focused beam 211, behind the focused beam 211 when viewed in the welding direction, and moves so that the scan with the laser light 21 is carried out from the outer periphery of the impeller 10 toward its center. In this case, the laser light 21, which is emitted from the main unit 2, is moved at a prescribed speed so that a central axis 91 of the longer side of the focused beam 211 is aligned to the central line 92 of the groove 14. To prevent oxidation by the atmosphere, an argon gas 7, which is one type of inert gas, is expelled from the shield gas nozzle 22 toward a molten zone or welding zone during scanning or emission of the laser light.

When melt-through bead welding is carried out by using the welding apparatus 1 as described above, a molten pool 6, with a teardrop shape in a plane view, is formed in the groove 14 as shown in FIG. 2A, and the spreading of wetness to the blade 13 and the back of the shroud 12 is enhanced, the blade 13 and shroud 12 being made of a metal that can be molten, so a backing bead 4, which is curved with an inwardly rounded depression, is formed at both sides of the end on the abutting side, or the upper end of the blade 13. Results of experiments carried out by the inventors of this application have revealed that when the width of the groove 14 is at least twice the thickness of the blade 13 and the thickness of the shroud 12, at the bottom of the groove 14, is less than the thickness of the blade 13, a backing bead 4 with an inwardly curved depression and a radius equal to or larger than the thickness of the blade 13 can be formed, with the backing bead 4 being sufficient to alleviate the stress concentration generated during the use of the impeller.

As described above, the impeller 10 prepared by using the welding method and welding apparatus in this embodiment has the groove 14 on the surface of the shroud 12, which is opposite to the surface against which the blade 13 abuts. The bottom 14a of the groove 14 is bonded to an end of the blade 13 by melt-through bead welding. Since the backing bead 4, that is formed during the melt-through bead welding. is curved with an inward depression, the stress concentration generated during the use of the impeller can be sufficiently alleviated.

Upon completion of the melt-through bead welding, a second step starts in which the metallic powder 8 is supplied to the molten pool 6 for overlaying welding while the bottom 14a of the groove 14 is scanned with the laser light 21, as shown in FIGS. 1B and 2B.

In the overlaying welding step, the shield gas nozzle 22 is disposed in a lateral direction of the focused beam 211, in front of the focused beam 211 when viewed in the welding direction, and moves so that the scan with the laser light 21 is carried out from the outer periphery of the impeller 10 toward its center. In this case, the focused beam 211 is a thin rectangle, as shown in FIG. 2B, that measures 1 mm in width and 10 mm in length as in the melt-through bead welding step. The central axis 91 of the longer side of the focused beam 211 is now orthogonal to the central line 92 of the groove 14. To prevent oxidation by the atmosphere, an argon gas 7, which is one type of inert gas, is expelled from the shield gas nozzle 22 toward a molten zone or welding zone. The metallic powder supply nozzle 23, which is disposed in the shield gas nozzle 22, expels the metallic powder 8, which is a filler metal, toward the molten zone so as to supply it for overlaying welding. The material of the metallic powder 8 is the same as the material, SUS410, for example, of the disc 11, shroud 12, and blades 13.

Figure 3B:
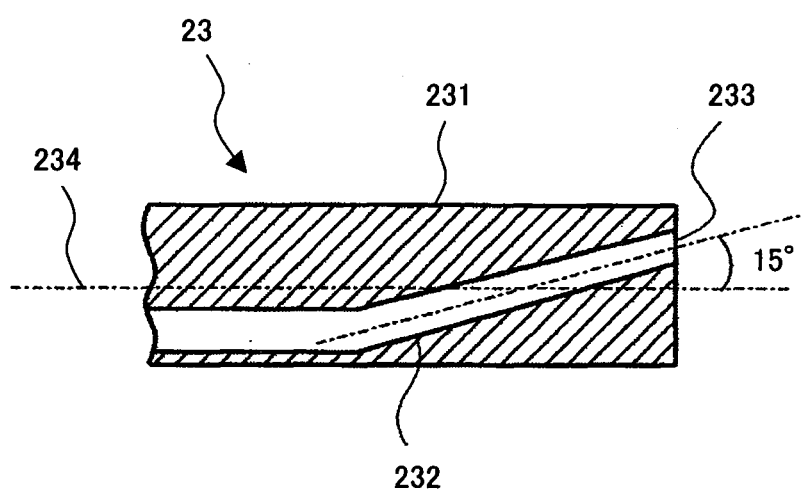
FIG. 3B is an enlarged, detailed cross sectional view near the tip of a metallic powder supply nozzle used during overlaying welding in the second step.

FIG. 3B illustrates an example of the cross section of an end 231 of the metallic powder supply nozzle 23. In this embodiment, a metallic powder flow channel 232 is bent at an end 233 by 15°.. relative to the central axis 234 of the metallic powder supply nozzle 23, and the cross section of the flow path is gradually reduced or tapered toward an outlet 233.

When overlaying welding is performed in this configuration, the spread of the expelled metallic powder 8 is suppressed, enabling the metallic powder 8 to be efficiently deposited to the molten zone. As a result, the gap between the laser light 21 and a center portion of the shroud 12 is narrowed. Accordingly, even when the central axis 234 of the metallic powder supply nozzle 23 cannot be oriented linearly toward the focused beam 211, it is possible to leave a distance of 50 mm or more between the metallic powder supply nozzle 23 and the focused beam 211 at the bottom of the groove and to prevent the metallic powder supply nozzle 23 from coming into contact with the laser light 21, disc 11, and shroud 12 during overlaying welding.

When the central axis 91 of the longer side of the focused beam 211 is orthogonal to the central line 92 of the groove 14 during scanning, the molten pool 6 formed in the groove 14 becomes wide, as a laterally long ellipse, so an overlaying bead 5 with a large bead width is obtained, making the overlaying welding efficient. When the width of the groove 14 was 10 mm or less, overlaying welding of 10 layers or less with the groove depth being 10 mm was possible in one path per layer. When the width of the groove 14 was from 10 mm to 20 mm, this type of overlaying welding of 5 layers or less with the groove depth being 10 mm was possible in two paths per layer.

As an order of working for the plurality of blades 13, it is preferable to execute the first step, in which melt-through bead welding is carried out for all blades 13, and to then execute the second step, in which overlaying welding is carried out. In the overlaying welding in the second step, a plurality of passes are required for one blade 13. When one pass or one layer is processed for each blade 13 in rotation, local deformation by the welding can be efficiently avoided. After actual welding of the impeller 10, a deformation ratio between the diameter of the impeller 10 and a reference plane before the welding was suppressed to less than 0.5%.

As described above, according to the welding method and welding apparatus for an impeller in this embodiment, the grooves 14 are formed in the shroud 12 to be welded to the blades 13, the laser light 21 is emitted toward the bottom 14a of each groove 14 in a prescribed aspect to melt the bottom, and melt-through bead welding is performed to bond the bottom 14a of the groove 14 to an end of the blade 13 in such a way that the bead 4 formed on the back of the shroud 12 is curved with an inward depression. Concentration of stress generated during the use of the impeller 10 is sufficiently alleviated and finish machining applied to the backing bead can be eliminated or simplified, thus improving the productivity.

As described above, after the melt-through bead welding has been carried out for the groove 14, while the focused beam 211 of the laser light 21 is scanned at an inclined angle with respect to the longitudinal direction of the groove 14, which is different from the inclined angle during the melt-through bead welding, the metallic powder 8, or filler metal, is supplied to the molten zone to carry out overlaying welding. Accordingly, a prescribed strength can be ensured for the welded joint, the efficiency of the overlaying welding can be improved, the total amount of welding heat input can be reduced, and deformation by welding can be alleviated. Since the need to use a deformation preventing material and backing material can be eliminated, productivity is further improved.

With the welding apparatus 1 according to this embodiment, the shield gas 7 and filler metal 8 are supplied in a lateral direction of the focused beam 211 of the laser light 21 at an angle different from an angle at which the laser light is emitted. Even when the impeller 10 is a so-called three-dimensional impeller that has blades 13 with a three-dimensional twist, interference between the impeller 10 and parts of the welding apparatus, such as the nozzle 22 that supplies a shield gas and the nozzle 23 that supplies a filler metal, can be surely avoided and thereby welding can be performed efficiently and appropriately.

Also, With the welding apparatus for an impeller according to this embodiment, the shield gas nozzle 22 is unified with the metallic powder supply nozzle 23 to form a double-tube structure, so that space between the shield gas nozzle 22 and the impeller 10 becomes wider. Interference between the impeller and parts of the welding apparatus can be surely avoided and thereby welding can be performed efficiently and appropriately.

A second embodiment of the inventive welding method and welding apparatus will be described with reference to FIGS. 4A, 4B, 5A, 5B, and 6.

In a case in which an impeller 10' comprises a plurality of blades 13 as well as a disc 11 and a shroud 12 that lacks blades, this embodiment is applied when the blades 13 and the disc 11 are mutually bonded and the blades 13 and shroud 12 are also mutually bonded. Since the bonding between each blade 13 and disc 11 and the bonding between the blade 13 and shroud 12 are basically the same, since grooves 14 are also formed in the shroud 11 in advance, only the bonding between the blade 13 and shroud 12 will be described as in the first embodiment described above. The basic structures of the impeller 10' and welding apparatus 1 are also substantially the same as in the first embodiment, so like elements and structures are denoted by like reference numerals to eliminate duplicate descriptions. The descriptions that follow will focus on differences between the first and second embodiments.

The focused beam 211 in this embodiment has a thin rectangular shape that measures 0.5 mm in width and 12 mm in length. In a first step, in which melt-through welding is performed, the angle formed by the central axis 91 of the longer side of the focused beam 211 and the central line 92 of the groove 14 falls within the range from 0.degree. to 10.degree., as shown in FIG. 5A. In this embodiment as well, the disc 11, shroud 12, and blade 13 are made of the same material SUS630, for example. In this configuration, when the laser light 21 is emitted toward the bottom 14a of the groove 14 for scanning in the same way as in the first embodiment, the molten pool 6, the length of which is longer than its width, is formed at the bottom 14a of the groove 14, and the spreading of wetness to the blade 13 and the back of the shroud 12 is enhanced. The blade 13 and shroud 12 are made of a metal that can be molten, so the backing bead 4, with an inwardly curved depression, is formed. When the width of the groove 14 was at least twice the thickness of the blade 13 and thickness of the shroud, at the bottom of the groove 14, is less than the thickness of the blade 13, it was possible to form the backing bead 4 with an inwardly curved depression and with a radius equal to or larger than the thickness of the blade 13.

In a second step, in which overlaying welding is performed, the laser light 21 is emitted from the outer periphery of the impeller 10' toward its center so that the angle formed by the central axis 91 of the longer side of the focused beam 211 and the central line 92 of the groove 14 falls within the range from 80.degree. to 90.degree.. In addition, an argon gas 7 is expelled from the shield gas nozzle 22 toward a molten zone or welding zone and a metallic powder 8, which is a filler metal, is expelled from the metallic powder supply nozzle 23 that is disposed in the shield gas nozzle 22, toward the molten zone so that overlaying welding is performed, the metallic powder 8 being supplied together with the argon gas 7.

Figure 6:
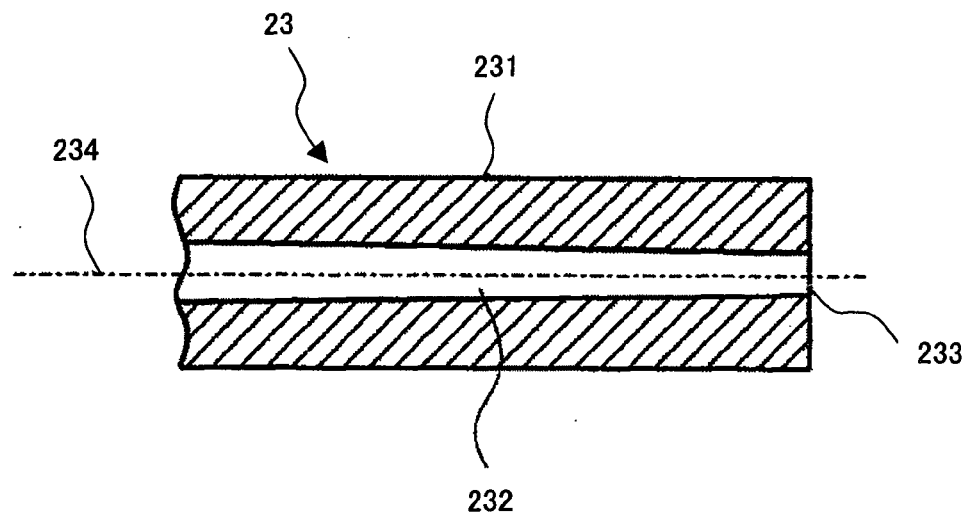
FIG. 6 is an enlarged, detailed cross sectional view near the tip of a metallic powder supply nozzle used during overlaying welding in the second step in the second embodiment shown in FIGS. 4A and 4B.

FIG. 6 is a cross sectional view of the end 231 of the metallic powder supply nozzle 23. As shown in the drawing, the cross section of the flow channel 232 is gradually reduced or tapered toward the outlet 233. This arrangement suppresses the spread of the expelled metallic powder 8 and enables the metallic powder 8 to efficiently deposit on the molten zone. Accordingly, it is possible to leave a distance of 50 mm or more between the metallic powder supply nozzle 23 and the focused beam 211 and to prevent the metallic powder supply nozzle 23 from coming into contact with the shroud 12 during overlaying welding.

Figure 4A:
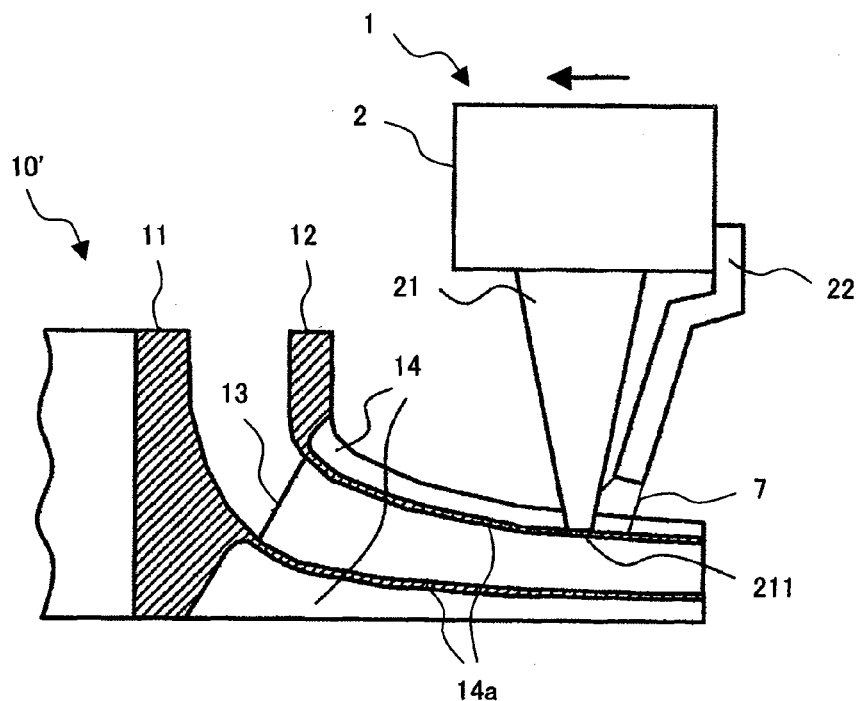
FIGS. 4A and 4B illustrate a second embodiment of the inventive welding method and welding apparatus for an impeller.
Figure 4B:
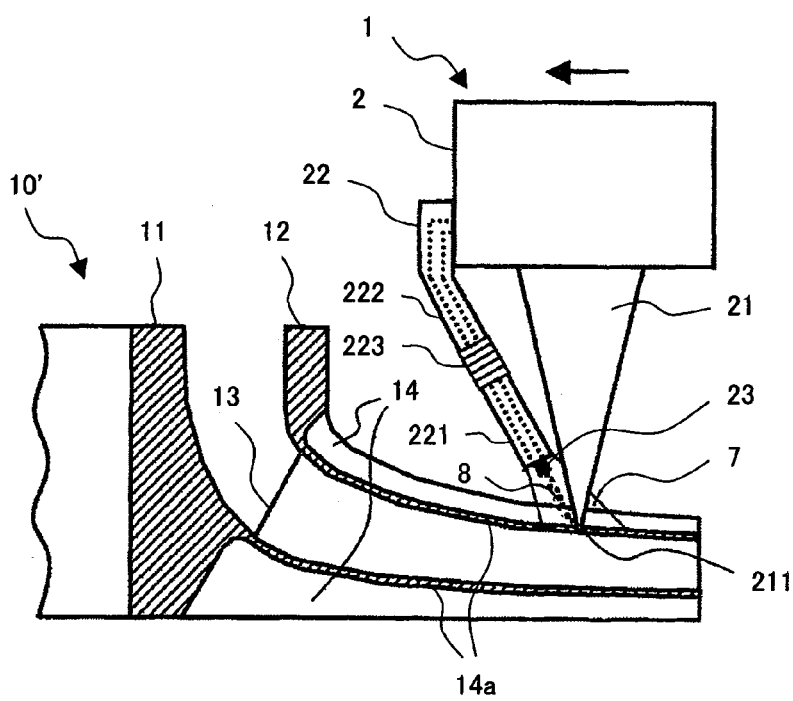

When, as shown in FIG. 4B, the tip or outlet 221 of the shield gas nozzle 22 is supported by the main unit 2 through an elastic, bendable member 223, which is shaped like a spring, tolerance is generated for the moving path of the main unit 2. Accordingly, when the tip 221 touches the disc 11 or shroud 12, only the tip 221 bends and the position of the metallic powder supply nozzle 23 is left unchanged. When the tip 221 moves away from the disc 11 or shroud 12, the elastic, bendable member 223 restores its original shape and the tip 221 returns to its original position. As a result, stable supply of the metallic powder 8 to the focused beam 211 at the bottom of the groove becomes possible.

After actual welding of the impeller 10', a deformation ratio between the diameter of the welding apparatus 1 and a reference plane before the welding was suppressed to less than 0.5%.

As described above, the welding method and welding apparatus in the second embodiment achieve substantially the same effect as in the first embodiment.

Although, in the first and second embodiments, the material of the disc 11, shroud 12, and blade 13 is the same as the material of the metallic powder 8, which is a filler metal, the material is SUS410 or SUS630, for example, they may be made of different materials. Metallic powder of a different material may also be used as the filler metal. The filler metal may be a welding rod or welding wire. The argon gas 7 and the carrier gas for the metallic powder 8 may be a nitrogen gas or another inert gas. The shield gas nozzle 22 and metallic powder supply nozzle 23 may be disposed at positions opposite to the positions in the first and second embodiments with respect to the welding or scanning direction. The dimensions and shape of the focused beam 211 are not limited to the first and second embodiments. The focused beam can be obtained by a direct diode laser or by a combination of a beam shaping optical system and a laser for welding.

What is claimed is:

1. A welding method for forming an impeller having a plurality of blades, and an exterior body including a disk and a shroud, comprising the steps of:
   forming a groove having a groove bottom, a longitudinal direction, a prescribed depth and a prescribed width on the exterior body;
   locating the groove on a first surface of the exterior body, which exterior body first surface is opposite to a second surface of the exterior body and against which a blade of the plurality of blades abuts,
   emitting laser light toward the bottom of the groove;
   focusing the beam of the laser light having one of a thin rectangular and a long elliptical shape with a long side;
   scanning the focused beam of laser light a first time along a longitudinal direction of the groove;
   positioning the longer side of the focused beam of laser light one of parallel to and inclined at a prescribed angle with respect to the longitudinal direction of the groove;
   performing melt-through bead welding and forming a molten zone for bonding the bottom of the groove to an end of the blade;
   forming a bead on the second surface of the exterior body during the melt-through bead welding, the bead being curved with an inward depression; and performing overlaying welding after completing the melt-through bead welding by supplying a filler metal to the molten zone while scanning the bottom of the groove a second time with the focused beam of laser light.

2. The welding method according to claim 1, further including:
forming the groove with respect to a longitudinal direction of the blade and positioning the end of the blade at a center of the groove, in a width direction of the groove, in a plane view; and
scanning the focused beam of laser light such that the center part of the bottom of the groove in the width direction is scanned by the focused bead of laser light.

3. The welding method according to claim 1, further including:
scanning the focused beam of laser light during the overlaying welding along the longitudinal direction of the groove and including one of a longer side and a longer axis of the focused beam of laser light at an angle different from a prescribed angle in the melt-through bead welding with respect to the longitudinal direction of the groove.

4. A welding method for forming an impeller having at least one of a disc and a shroud with a plurality of blades and another one of a disc and a shroud without blades, comprising the steps of:
forming a groove having a groove bottom, a longitudinal direction, a prescribed depth and a prescribed width on a first surface of the one of the disc and the shroud;
locating the groove opposite to a second surface of the one of the disc and shroud against which one end of a blade of the plurality of blades abuts;
positioning the end of the abutting side of the blade at a center part, in a width direction, of the groove in a plane view,
scanning the center part in the width direction of the bottom of the groove with laser light;
providing the laser light as a focused beam of laser light having one of a thin rectangular and a long elliptical shape, along a longitudinal direction of the groove;
bonding the bottom of the groove to the end of the blade by using melt-through bead welding and forming a molten zone;
performing overlaying welding after completion of the melt-through bead welding by supplying a filler metal to the molten zone and filling the groove while scanning is the focused beam of laser light in the longitudinal direction of the groove;
inclining one of a longer side and a longer axis of the focused beam of laser light at an angle different from a prescribed angle in the melt-through bead welding with respect to the longitudinal direction of the groove;
performing the scanning in the melt-through bead welding with the one of the longer side and the longer axis of the focused beam of laser light being parallel to the longitudinal direction of the groove;
performing the scanning in the overlaying welding with one of the longer side and the longer axis of the focused beam of laser light being orthogonal to the longitudinal direction of the groove;
expelling an inert gas to a welding zone in a lateral direction of the focused beam of laser light and shielding the welding zone from the atmosphere; and
supplying the filler metal through a jet flow of the inert gas to the molten zone.

5. A welding method for forming an impeller having a disc, a shroud, and a plurality of blades, comprising steps of:
forming a groove having a groove depth, a longitudinal direction, a prescribed depth and a prescribed width, on a first surface of one of the disc and the shroud, which first surface is opposite to a second surface against which an end of a blade of the plurality of blades abuts;
positioning the end of the abutting side of the blade at a center part, in a width direction, of the groove in a plane view
scanning the center part in the width direction of the bottom of the groove with laser light
providing the laser light as a focused beam of laser light having one of a thin rectangular and a long elliptical shape, along a longitudinal direction of the groove;
bonding the bottom of the groove to the end of the blade by using melt-through bead welding and forming a molten zone;
performing overlaying welding after completion of the melt-through bead welding by supplying a filler metal to the molten zone and filling the groove while scanning of the focused beam of laser light is performed in the longitudinal direction of the groove;
inclining one of a longer side and a longer axis of the focused beam of laser light at an angle different from a prescribed angle in the melt-through bead welding with respect to the longitudinal direction of the groove;
performing the scanning in the melt-through bead welding with the one of the longer side and the longer axis of the focused beam of laser light being parallel to the longitudinal direction of the groove;
performing the scanning in the overlaying welding with the one of the longer side and the longer axis of the focused beam of laser light being orthogonal to the longitudinal direction of the groove,
expelling an inert as to a welding zone in a lateral direction of the focused beam of laser light and shielding the welding zone from the atmosphere; and
supplying the filler metal through a jet flow of the inert gas to the molten zone.

6. The welding method according to claim 3, further including:
scanning the focused beam of laser light in the melt-through bead welding with the one of the longer side and the longer axis of the focused beam of laser light being parallel to the longitudinal direction of the groove; and
scanning the focused beam of laser light in the overlaying welding with the one of the longer side and the longer axis of the focused beam of laser light being orthogonal to the longitudinal direction of the groove.

7. The welding method according to claim 1, further including:
expelling an inert gas to a welding zone in a lateral direction of the focused beam of laser light and shielding the welding zone from the atmosphere: and
supplying the filler metal through a jet flow of the inert gas to the molten zone.

8. The welding method according to claim 1, further including:
expelling a first inert gas to a welding zone in a lateral direction of the focused beam of laser light and shielding the welded part from the atmosphere;
forming a jet flow of a second inert gas in a jet flow of the first inert gas and having a speed of the jet flow of the second insert gas different from a speed of the jet flow of the first inert gas; and
including metallic powder as the filler metal in the jet flow of the second inert gas for supplying the metallic powder to the molten zone.

9. The welding method according to claim 4, further including:
- expelling a first inert gas to a welding zone in a lateral direction of the focused beam of laser light and shielding the welded part from the atmosphere;
- forming a jet flow of a second inert gas in a jet flow of the first inert gas and having a speed of the jet flow of the second inert gas different from a speed of the jet flow of the first inert gas; and
- including metallic powder as the filler metal in the jet flow of the second inert gas for supplying the metallic powder to the molten zone.

10. The welding method according to claim 5, further including:
- expelling a first inert gas to a welding zone in a lateral direction of the focused beam of laser light and shielding the welded part from the atmosphere;
- forming a jet flow of a second inert gas in a jet flow of the first inert gas and having a speed of the jet flow of the second inert gas different from a speed of the jet flow of the first inert gas; and
- including metallic powder as the filler metal in the jet flow of the second inert gas for supplying the metallic powder to the molten zone.

* * * * *